Patented Jan. 2, 1923.

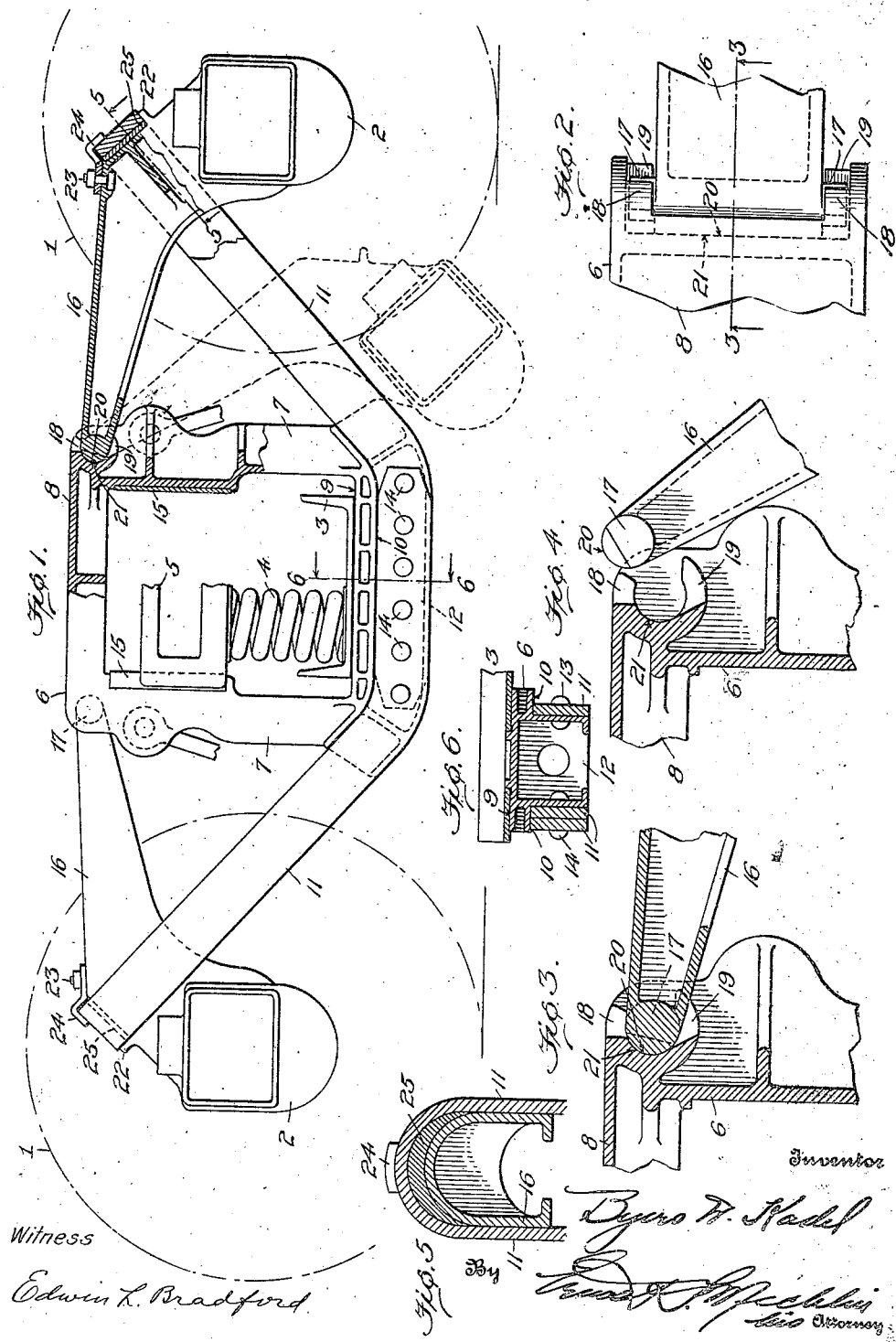

1,440,999

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

CAR TRUCK.

Application filed April 25, 1921, Serial No. 464,427. Renewed June 7, 1922. Serial No. 566,546.

*To all whom it may concern:*

Be it known that I, BYERS W. KADEL, a citizen of the United States, residing at Baltimore, State of Maryland, have invented certain new and useful Improvements in Car Trucks; and I do hereby declare the following to be a full, clear, and exact description of the invention, such as will enable others skilled in the art to which it appertains to make and use the same.

My invention relates to car trucks and particularly to those in which the truck side frames are of the trussed or arch bar type. The principal object of the invention is to provide a simple, strong and efficient construction permitting the truck wheels to be removed and replaced expeditiously and with comparatively little labor. A further object of the invention is to afford a truck side frame structure consisting of a few rugged parts which are operatively connected in a simple and reliable manner.

The principal feature of the invention, generally stated, consists in providing a car truck with a plurality of side frames of the trussed or arch bar type, each of said frames comprising an upper arch bar element, a lower arch bar element, and a strut or central frame interposed between said arch bars, the upper arch bar element involving a plurality of separable members each of which is rigidly connected to a corresponding journal box, the parts being so combined that each of the separable upper arch bar members and its corresponding journal box may be disassembled from the truck as a connected unit.

A further feature of the invention consists in forming a car truck with side frames involving a plurality of articulated members constituting a toggle mechanism, and in combining tension element means with said toggle mechanism to constitute a truss.

Another feature of the invention consists in constructing an arch bar car truck with a plurality of side frames each having a centrally disposed strut formed with spaced truck columns which are integrally united at their upper ends by means constituting a part of the upper arch bar element of the side frame, and in combining therewith a lower arch bar element and separable upper arch bar members, each of the latter being rigidly connected to a corresponding one of the journal boxes of the truck.

Another feature of the invention consists in providing the truck with arch bar side frames each of which comprises rigidly connected truck columns, a plurality of separable upper arch bar members integrally attached to corresponding journal boxes, and a lower arch bar element having looped connection with the said separable arch bar members.

A still further feature of the invention resides in providing an arch bar truck side frame with a centrally disposed frame or strut and a plurality of separable arch bar members, each of the latter having a journal box integrally united thereto and being detachably connected to the centrally disposed strut or frame by interlocking means.

There are other features of the invention residing in particular combinations of elements and in details of construction, all as will hereinafter appear.

In the drawings illustrating the preferred embodiment of the invention, the scope whereof is pointed out in the claims,—

Figure 1 is a view, partly in side elevation and partly in vertical section, of a car truck embodying the invention, the truck wheels being indicated by dot and dash lines, a portion of the truck bolster being broken away, certain of the bolster springs being omitted, and one of the separable arch bar members and its attached journal box being shown in dotted lines in a position assumed during the operation of removing or replacing the truck wheels.

Figure 2 is a detail plan view showing the interlocking connection between the separable upper arch bar members of the truck and the centrally disposed frame or strut element of the structure.

Figure 3 is a detail sectional view on the line 3—3, Fig. 2.

Figure 4 is a view corresponding to Fig. 3 but illustrating the mode of assembling or disassembling the parts, the arch bar member to which the journal box is attached being shown in elevation.

Figure 5 is a detail section on the line 5—5, Fig. 1.

Figure 6 is a section on the line 6—6, Fig. 1.

In the drawings,—

1 indicates the wheels of the truck which are mounted upon axles (not shown) that cooperate with journal boxes 2 in the usual manner. The side frames of the truck may be and preferably are connected by a transversely extending spring plank 3 upon which are seated springs 4 that yieldingly support the bolster 5 in a well known manner.

Each of the spaced truck side frames is of the trussed or arch bar type and involves a centrally disposed frame 6 which functions as the strut member of the truss and which is preferably fashioned as an integral casting affording spaced columns 7 between which the bolster 5 projects. The portion 8 of the frame by which the columns 7 are rigidly connected at their upper ends constitutes, as will hereinafter appear, a part of the upper arch bar element of the side frame. The lower bar of the centrally disposed strut frame is provided on its upper side with a spring seat 9 upon which the spring plank 3 rests, and upon its under side said bar is formed with marginal seats 10 which are engaged by the upper edges of the lower arch bar or tension element 11 of the side frame. When, as shown in the drawings, the lower arch bar is of loop form it is preferred to provide the lower end of the centrally disposed strut or frame with a downwardly projecting portion 12 which extends between the spaced segments of the lower arch bar or tension element and thus spaces them apart. Outward movement of the spaced portions of the tension element 11 with respect to the strut 6 of the truss may be prevented by means of rivets 13 and 14, the latter also serving to unite the overlapped ends of the single member by which the lower arch bar 11 is preferably formed. If desired the truck columns 7 may be protected from wear by means of chafing plates 15 which are interposed between the bolster 5 and the respective columns.

Upon opposite sides of the strut 6 and having articulated connection therewith are separable compression members 16 which, together with the upper bar 8 of the centrally disposed strut frame, constitute the upper arch bar of the side frame. Each of the separable arch bar members 16 is rigidly united to a corresponding one of the journal boxes 2, as for example, by forming them as a single casting. The members 16 and the strut 6 are preferably pivotally connected above the journal boxes so that these several articulated parts which together form the upper arch bar or compression element of the truss, constitute a toggle mechanism which is interposed between the journal boxes of the side frame.

The detachable connection of the separable arch bar members 16 to the centrally disposed frame 6 may be conveniently effected by providing each of said members 16 with oppositely projecting trunnions 17 which are cut away upon one side or made of segment form so as to enable them, when properly positioned, to be assembled with or disassembled from correspondingly curved segmental lugs 18 and 19, respectively, with which the strut member 6 is provided on opposite sides adjacent the upper ends of the truck columns 7. The segmental trunnions 17 and the cooperating segmental lugs 18 and 19 provide interlocking means whereby the separable upper arch bar members 16 are detachably connected to the strut 6 of the side frame. The inner ends of the members 16 are preferably rounded between their segmental trunnions 17, as at 20, to afford an extended bearing area cooperating with the correspondingly curved bearing surfaces 21 which form continuations of the inner surfaces of the locking lugs 18 and 19.

The centrally disposed frame 6 and the separable arch bar members 16 are combined to constitute a truss by means of a lower arch bar or tension element 11 which is preferably fashioned from a single bar that is looped over the outer ends of each upper arch bar compression member 16 and passes beneath the centrally disposed frame or strut 6 to which its overlapped ends may be secured by means of rivets 14.

The looped ends of the lower arch bar 11 may be maintained in assembled relation with the separable members 16 by providing each of the latter with a lug 22 against which the lower edge of the tension element is adapted to bear, and by mounting upon each of said members 16, as by means of bolts 23, suitable clips or clamps 24 adapted to overlap the looped ends of the tension member and engage the upper edge thereof. If desired, suitably curved fillers 25 may be interposed between the looped ends of the lower arch bar and the respective upper arch bar members 16.

In assembling the truck the frames or struts 6 and the lower arch bars 11 may be secured to each other and the spring plank 3, bolster 5 and bolster springs 4 be placed in position. The wheels and axles of the truck may then be associated with the respective journal boxes 2 and the corresponding upper arch bar members 16, which latter, as indicated in dotted lines in Fig. 1, are then passed between the spaced portions of the tension element 11 of the truss so as to enter their segmental trunnions 17 between the segmental lugs 18 and 19 of the strut member 6. The strut 6 and associated tension elements or lower arch bars 11 are then lowered to normal position and the clips 24 are secured in place by the bolts 23, thus completing the assembly of the structure.

When it is desired to take out a set of wheels jacks may be placed under the side frames in line with the truck columns 7 adjacent the wheels to be removed. By operating the jacks to elevate the side frames until the appropriate upper arch bar members 16 can be brought to the position indicated in dotted lines in Fig. 1, the members 16 may be disassembled from the remaining elements of the truck, after the clips 24 have been detached, thus allowing the wheels to be removed.

I claim:—

1. A car truck having side frames involving a plurality of articulated members constituting a toggle mechanism, and tension element means combined with said toggle mechanism to form a truss.

2. A car truck having side frames, and a plurality of journal boxes associated with each side frame, each of said side frames involving a plurality of articulated members constituting a toggle mechanism, and tension element means combined with said toggle mechanism to form a truss, said toggle mechanism being interposed between and connected to the journal boxes associated therewith.

3. A car truck having side frames, and a plurality of journal boxes associated with each side frame, each of said side frames involving a plurality of articulated members constituting a toggle mechanism interposed between and connected to the said journal boxes associated therewith, and means for preventing relative movement of said articulated members when the truck is in service.

4. An arch bar truck side frame having an upper arch bar element, a lower arch bar element, and truck columns interposed between said arch bars and adapted to receive a bolster between them, said upper arch bar element involving a plurality of separable members each of which is provided with an integrally attached journal box.

5. An arch bar truck side frame having an upper arch bar element, a lower arch bar element, and a strut interposed between said arch bars, said upper arch bar element involving a plurality of separable members each of which is provided with an integrally attached journal box.

6. An arch bar car truck comprising a plurality of journal boxes and a plurality of side frames, each of said side frames having an upper arch bar element, and a strut interposed between said arch bars, said upper arch bar element involving a plurality of separable members each of which is rigidly secured to a corresponding one of said journal boxes, and each of said separable members and its corresponding journal box being adapted to be disassembled from said truck as a connected unit.

7. An arch bar car truck comprising a plurality of journal boxes and a plurality of side frames, each of the latter having a centrally disposed frame provided with a bolster opening, a lower arch bar element, and an upper arch bar element, said upper arch bar element being constituted in part by a portion of said centrally disposed frame and in part by a plurality of separable members which are respectively connected to said journal boxes and between which said centrally disposed frame is interposed.

8. A car truck having spaced side frames, a vertically movable bolster, and means interposed between said bolster and side frames for yieldingly supporting said bolster, each of said side frames constituting a truss comprised of a centrally disposed frame, compression members rigidly connected to the respective journal boxes of the truck and detachably connected at their inner ends to the opposite sides of said centrally disposed frame, and tension element means combined with said centrally disposed frame and said compression members to form a truss, said compression members and their respective journal boxes being adapted while in connected relation to be disassembled from said centrally disposed frame and said tension element means.

9. A car truck having spaced side frames, a vertically movable bolster, and means interposed between said bolster and side frames for yieldingly supporting said bolster, each of said side frames comprising a centrally disposed strut, compression members connected to the respective journal boxes of the truck and pivotally connected to said strut, and tension element means combined in trussed relation with said strut and said compression members, said means being adapted to prevent rotation in one direction of said compression members with respect to said strut.

10. A car truck having spaced side frames, a bolster, means interposed between said bolster and side frames for yieldingly supporting said bolster, and a plurality of journal boxes associated with the axles upon which the wheels of the truck are mounted, each of said side frames involving a truss comprising a strut element, a tension element, and a plurality of compression members secured to the respective journal boxes and detachably engaging said strut, said compression members and their respective journal boxes being adapted without being disconnected from each other to be disassembled from said strut and said tension element, and said tension element serving as means for maintaining said journal boxes of each side frame in fixed position relative to each other when the truck is in service.

11. A car truck having spaced side frames, a bolster, means interposed between said bolster and side frames for yieldingly supporting said bolster, and a plurality of journal boxes associated with the axles upon which the wheels of the truck are mounted, each of said side frames involving a truss comprising a strut, tension element means, and a plurality of compression members secured to the respective journal boxes without intervention of said tension element means and detachably engaging said strut above said journal boxes.

12. A car truck having wheels, axles, journal boxes for said axles, and side frames, each of said frames comprising a centrally disposed portion, a plurality of members connected to the respective journal boxes and movably engaging said centrally disposed portion, and means for preventing said centrally disposed portion from moving downwardly with respect to the associated journal boxes when the truck is in service.

13. A car truck having side frames involving a plurality of articulated members constituting a toggle mechanism, journal boxes integrally attached to respective members of said toggle mechanism, and tension element means cooperating with said toggle mechanism to form a truss.

14. A car truck having side frames, journal boxes for cooperating with the axles of the truck, a bolster, and means interposed between said bolster and side frames for yieldingly supporting said bolster, each of said side frames constituting a truss comprised of a centrally disposed frame, a plurality of compression members each of which detachably engages said centrally disposed frame and is integrally united to an individual one of said journal boxes, and tension element means combined with said centrally disposed frame and said compression members to form a truss.

15. An arch bar truck side frame comprising a centrally disposed frame, a lower arch bar element, and a plurality of separable upper arch bar members each of which is provided with an integrally attached journal box, said centrally disposed frame and said upper arch bar members being provided with interlocking means whereby they may be detachably connected.

16. An arch bar truck side frame comprising rigidly connected truck columns, a plurality of separable upper arch bar members each of which is provided with an integrally attached journal box, and a lower arch bar element having looped connection with said separable arch bar members.

17. A car truck comprising a plurality of journal boxes and a plurality of arch bar side frames, each of said side frames involving a center casting formed with spaced columns which are integrally united at their upper ends by a portion of said casting constituting an upper arch bar member, an upper arch bar element including a plurality of separable upper arch bar members each of which is rigidly connected to a corresponding one of said journal boxes, and a lower arch bar element having looped connection with said separable upper arch bars.

18. An arch bar truck side frame comprising a centrally disposed frame, a lower arch bar element, and a plurality of separable upper arch bar members each of which is provided with an integrally attached journal box, said centrally disposed frame being provided on opposite sides with segmental lugs, and each of said upper arch bar members being provided adjacent one end with a plurality of segmental trunnions which are adapted to interlock with the adjacent segmental lugs of said centrally disposed frame.

In testimony whereof I affix my signature.

BYERS W. KADEL.